(12) United States Patent
Ogasawara et al.

(10) Patent No.: US 6,859,429 B2
(45) Date of Patent: Feb. 22, 2005

(54) ABERRATION CORRECTING UNIT, OPTICAL PICKUP APPARATUS, AND RECORDING/REPRODUCING APPARATUS

(75) Inventors: Masakazu Ogasawara, Tsurugashima (JP); Masayuki Iwasaki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 589 days.

(21) Appl. No.: 09/863,908

(22) Filed: May 24, 2001

(65) Prior Publication Data

US 2002/0012312 A1 Jan. 31, 2002

(30) Foreign Application Priority Data

May 24, 2000 (JP) ........................................ 2000-152270

(51) Int. Cl.[7] .............................................. G11B 7/00
(52) U.S. Cl. .............................. 369/112.02; 369/112.16; 369/53.19
(58) Field of Search ........................ 359/637; 369/44.32, 369/94, 112.02, 112.16, 112.17, 12.18, 112.19, 112.21, 44.23, 13.29, 53.19

(56) References Cited

U.S. PATENT DOCUMENTS

| | | | |
|---|---|---|---|
| 4,572,616 A | 2/1986 | Kowel et al. | |
| 5,787,061 A | 7/1998 | Tsuchiya et al. | |
| 6,125,088 A | * 9/2000 | Ogasawara | 369/112.02 |
| 6,130,872 A | 10/2000 | Sugiura et al. | |
| 6,151,154 A | * 11/2000 | Ogasawara et al. | 359/279 |
| 6,172,957 B1 | 1/2001 | Ogasawara | |
| 6,532,202 B1 | * 3/2003 | Wada et al. | 369/112.02 |
| 6,584,058 B1 | * 6/2003 | Yoshikawa et al. | 369/112.02 |

FOREIGN PATENT DOCUMENTS

| | | |
|---|---|---|
| EP | 446949 A1 | 9/1991 |
| EP | 1011009 A1 | 6/2000 |

OTHER PUBLICATIONS

Chen et al., "Method of Compensating for Aberrations in Electron Holography By Using a Liquid–Crystal Spatial–Light Modulator", vol. 33; No. 7, Mar. 1994 pp. 1187–1193.
Patent Abstracts of Japan, vol. 1999, No. 1, Jan. 29, 1999 (Abstract of JP 10 269611).
Patent Abstracts of Japan, vol. 1999, No. 3, Mar. 31, 1999 (Abstract of JP 10 319318).

* cited by examiner

Primary Examiner—Thang V. Tran
(74) Attorney, Agent, or Firm—Sughrue Mion, PLLC

(57) ABSTRACT

An aberration correcting unit includes: a first element having a liquid crystal sandwiched between first electrode layers, the first element having a first predetermined orientation direction and providing a light with a phase change by applying a voltage; a second element having a liquid crystal sandwiched between the second electrode layers, the second element having a second predetermined orientation direction that is substantially perpendicular to the first orientation direction and providing a light with a phase change by applying a voltage; and a polarization-direction changing element which is arranged between a light source of the light beam and the first and second elements to change a polarization direction of the light beam.

31 Claims, 10 Drawing Sheets

ABERRATION CORRECTING UNIT, OPTICAL PICKUP APPARATUS, AND RECORDING/REPRODUCING APPARATUS

BACKGROUND OF THE INVENTION

1. Field of the Invention

The present invention relates to a recording/reproducing apparatus for an information recording medium such as an optical disc or the like and to an aberration correcting unit and an optical pickup apparatus which are used for the recording/reproducing apparatus.

2. Description of the Related Art

There are optical discs such as a CD (Compact Disc) and a DVD (Digital Video Disc or Digital Versatile Disc) as well-known information recording media for optical recording and reproduction of information. Furthermore, the optical discs are of various types, for example, optical discs for reproduction only, write-once optical discs on which only additional recording can be done, and rewritable optical discs on which information can be erased and re-recorded. A recording medium having a plurality of recording layers on the same recording surface such as a 2-layer-per-side DVD is also being developed.

In addition, research and development are in progress for creating high-density optical discs and optical pickup apparatus and information recording and/or reproducing apparatus (hereinafter referred to as recording/reproducing apparatus) applicable to the high-density optical discs.

To cope with the high-density optical discs, there is a method of irradiating a laser beam of a small diameter onto the optical disc by increasing a numerical aperture (NA) of an objective lens provided in the optical pickup apparatus. Another method is the use of a light beam having a shorter wavelength.

However, the aberration of the light beam caused by an optical disc is increased when the numerical aperture NA of the objective lens is increased or a light beam having a shorter wavelength is used. This makes it difficult to improve accuracy of the information recording/reproduction performance.

For example, when an objective lens having a large numerical aperture NA is used, the amount of birefringence distribution which depends on the incidence angle is increased at the pupil surface of the optical disc, since the range of the incidence angle of the light beam to the optical disc is increased. This creates a problem of aberration due to the birefringence becoming more influential. In addition, when using an objective lens having a large numerical aperture and a light beam having a shorter wavelength, the influence of coma aberration is not negligible if the incident angle of the light beam to the normal direction (tilt angle) of the optical disc tilts at the time of recording or reproduction.

Although the aberration is also changed depending on a thickness of a transparent substrate (or transparent layer) through which the laser beam passes, since the thickness of a transparent substrate layer generally has an in-plane distribution, the aberration changes during the recording or reproduction of the optical disc. Particularly, the transparent layer thickness between the disc surface and the recording layer differs according to the recording layers in the optical disc having a plurality of recording layers on the same recording surface. Therefore, not only a magnitude of the aberration but also a distribution shape of the aberration in the plane perpendicular to an optical axis largely changes when changing the reading position or recording position from one recording layer to another.

An aberration correction liquid crystal unit having a liquid crystal such as a nematic liquid crystal or the like has been proposed in order to reduce the influence of the aberration upon recording or reproduction of the optical disc as mentioned above. There is disclosed a liquid crystal, for example, in the Japanese Patent Application Kokai H10-20263 as the liquid crystal unit for aberration correction as mentioned above.

FIG. 1 schematically shows an example of the aberration correcting unit. The aberration correcting unit has a structure such that a liquid crystal C such as a nematic liquid crystal or the like is held between transparent electrode layers A and B which are opposed to each other. The orientation state of the liquid crystal C can be changed by adjusting a voltage which is applied across the transparent electrode layers A and B. A birefringence change according to the orientation state is provided for a light when the light entering from one transparent electrode A (or B) passes through the liquid crystal C, and the light exits toward the other transparent electrode B (or A).

Furthermore, the transparent electrode layers A and B are formed in a divided manner, for example, each is divided into a plurality of transparent electrodes (a1, a2, and a3) and (b1, b2, and b3). The transparent electrodes a1, a2, and a3 are electrically separated from each other, and the transparent electrodes b1, b2, and b3 are also electrically separated from each other.

The liquid crystal C can be adjusted so as to have a plurality of different orientation states therein by applying different voltages across the transparent electrodes opposing each other, for example, between the transparent electrodes a1 and b1, a2 and b2, and a3 and b3, respectively. Birefringence changes corresponding to the orientation states change within the liquid crystal C are simultaneously provided to the incident light. Thus, an aberration caused in an optical path can be corrected by properly adjusting the plurality of orientation states of the liquid crystal element.

As mentioned above, the aberration is changed depending on the in-plane position perpendicular to the optical axis due to the change in transparent layer thickness upon recording or reproduction. Additionally, the aberration is changed when changing the recording layer.

According to the conventional aberration correcting unit as mentioned above, the aberration caused in the optical path of an optical system is corrected by changing the voltage that is applied to each electrode of the liquid crystal. It is, however, difficult to correct the aberration at high speed upon recording or reproduction, since a response speed is low for a liquid crystal such as a nematic liquid crystal or the like which is used for aberration correction.

OBJECTS AND SUMMARY OF THE INVENTION

The present invention is made to solve the above-described problems and it is an object of the present invention to provide an aberration correcting unit, an optical pickup apparatus, and a recording/reproducing apparatus of high performance, by which a high-speed correction of the aberration can be performed.

To achieve the object, according to one aspect of the present invention, there is provided an aberration correcting unit for correcting an aberration caused in an optical path of an optical system which irradiates a light beam onto a recording medium and guides reflection light reflected by the recording medium, which comprises: a liquid crystal element having electrode layers which are opposed to each other and a liquid crystal sandwiched between the electrode layers, the liquid crystal element having a predetermined orientation direction and providing a light passing therethrough with a phase change by applying a voltage across the electrode layers; and a polarization-direction changing element which is arranged in an optical path between a light source of the light beam and the liquid crystal element to change a polarization direction of the light beam.

According to another aspect of the present invention, there is provided an aberration correcting unit for correcting an aberration caused in an optical path of an optical system which irradiates a light beam onto a recording medium and guides reflection light reflected by the recording medium, which comprises: a liquid crystal element having electrode layers which are opposed to each other and a liquid crystal sandwiched between the electrode layers, the liquid crystal element having a predetermined orientation direction and providing a light passing therethrough with a phase change by applying a voltage across the electrode layers; a polarization-direction changing element which is arranged in an optical path between a light source of the light beam and the liquid crystal element to change a polarization direction of the light beam; and a controller for controlling the polarization-direction changing element to change the polarization direction of the light beam at a predetermined timing.

According to another aspect of the present invention, there is provided an optical pickup apparatus having the aberration correcting unit, which comprises: a light source for emitting the light beam; and a photodetector for detecting the light beam which has been reflected by the recording medium and passed through the aberration correcting unit.

According to another aspect of the present invention, there is provided a recording/reproducing apparatus which has the optical pickup apparatus and reads recorded information from a recording medium having a plurality of recording layers to perform reproduction, the recording/reproducing apparatus comprises: inter-layer jumping means for performing an inter-layer jump to change an irradiation of the light beam from one recording layer to another recording layer; and a controller for controlling the polarization-direction changing element to change the polarization direction of the light beam at the time of performing the inter-layer jump.

According to another aspect of the present invention, there is provided an aberration correcting unit for correcting an aberration caused in an optical path of an optical system which irradiates a light beam onto a recording medium and guides reflection light reflected by the recording medium, which comprises: a first liquid crystal element having first electrode layers which are opposed to each other and a liquid crystal sandwiched between the first electrode layers, the first liquid crystal element having a first predetermined orientation direction and providing a light passing therethrough with a phase change by applying a voltage across the first electrode layers; a second liquid crystal element having second electrode layers which are opposed to each other and a liquid crystal sandwiched between the second electrode layers, the second liquid crystal element having a second predetermined orientation direction that is substantially perpendicularly to the first orientation direction and providing a light passing therethrough with a phase change by applying a voltage across the second electrode layers; and a polarization-direction changing element which is arranged in the optical path between a light source of the light beam and the first and second liquid crystal elements to change a polarization direction of the light beam.

According to another aspect of the present invention, there is provided an optical pickup apparatus having the aberration correcting unit, which comprises: a light source for emitting the light beam; and a photodetector for detecting the light beam which is reflected by the recording medium and passes through in the aberration correcting unit.

According to another aspect of the present invention, there is provided a recording/reproducing apparatus which has the optical pickup apparatus and records and/or reproduces information to/from a recording medium having a plurality of recording layers, the recording/reproducing apparatus comprises: instructing means for generating an inter-layer jump command for changing a recording layer to which the light beam is irradiated from one recording layer to another recording layer on the basis of a read signal from the recording medium; inter-layer jumping means for performing the inter-layer jump in response to the inter-layer jump command; and a controller for controlling the polarization-direction changing element to change the polarization direction of the light beam at the time of performing the inter-layer jump.

DETAILED DESCRIPTION OF THE PREFERRED EMBODIMENTS

Embodiments of the present invention will be described in detail with reference to the drawings.

First embodiment

Figure 1:
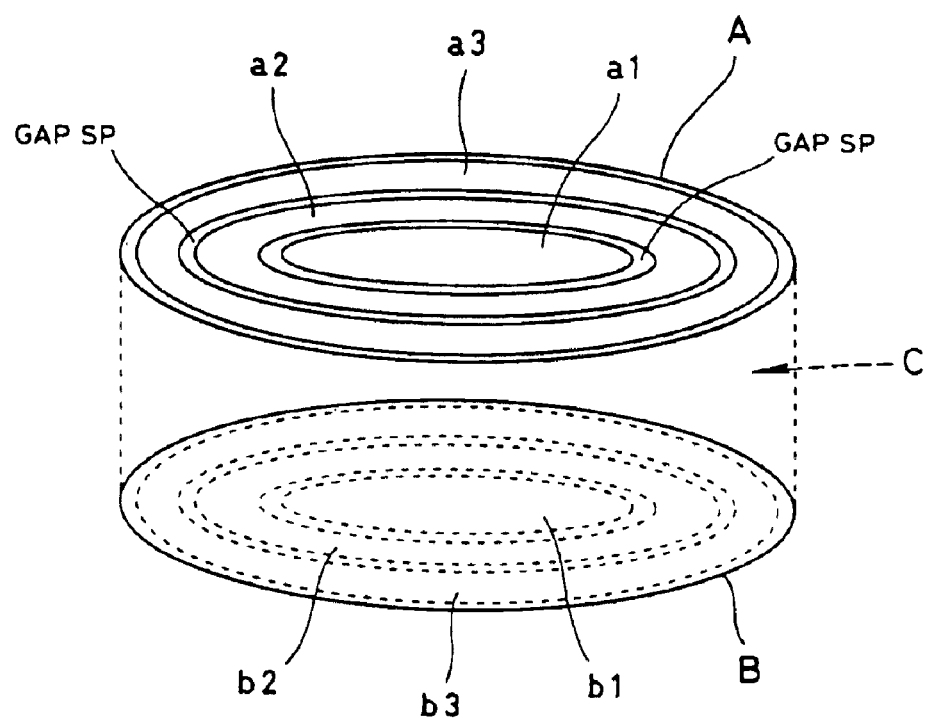
FIG. 1 is a diagram schematically showing an example of a conventional aberration correcting unit.
Figure 2:
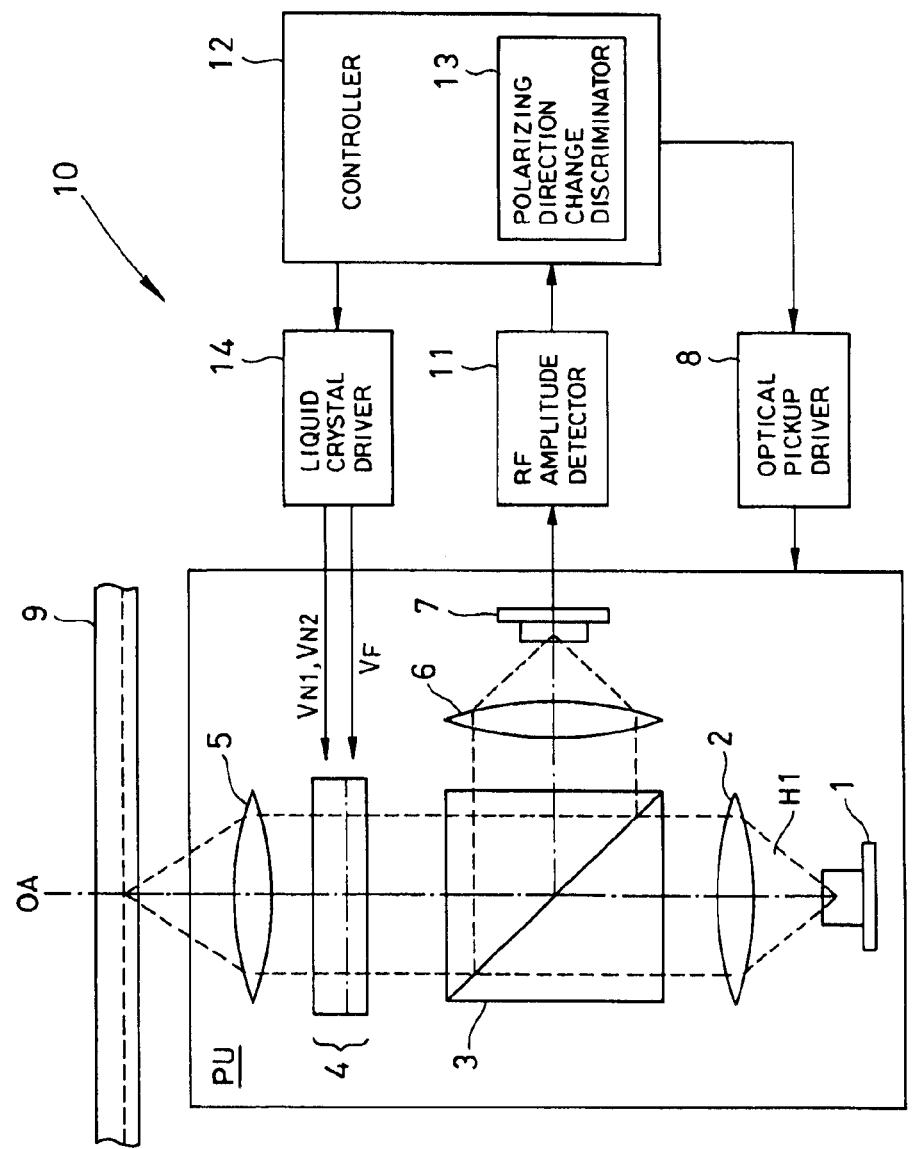
FIG. 2 is a block diagram showing a configuration of an aberration correcting apparatus provided in an information recording/reproducing apparatus.

FIG. 2 is a diagram schematically showing a configuration of an aberration correcting apparatus 10 provided in an information recording/reproducing apparatus. The aberration correcting apparatus 10 for recording or reproducing a 2-layer disc having two recording layers on the same surface or recording side will now be described as an example hereinbelow.

In FIG. 2, an optical pickup (PU) includes: a light source 1 for emitting a laser beam H1; a collimator lens 2; a beam splitter 3; an aberration correcting unit 4; an objective lens 5; a condenser lens 6; and a photodetector 7. The optical elements 1 to 7 are arranged along an optical axis OA.

The laser beam H1 emitted from the laser light source 1 in the optical pickup is reflected by an optical disc 9. The reflection light is detected by the photodetector 7, so that an RF signal is generated. The generated RF signal is sent to an RF envelope amplitude detector (hereinafter, simply referred to as an RF amplitude detector) 11. The RF amplitude detector 11 detects an envelope of the received RF signal to send as an RF amplitude signal to a controller 12. The controller 12 supplies a control signal to a liquid crystal driver 14 for driving the aberration correcting unit 4 on the basis of the received RF amplitude signal. The liquid crystal driver 14 generates a driving voltage to be applied to the aberration correcting unit 4 in accordance with the control signal and supplies it to the aberration correcting unit 4. An optical pickup driver 8 performs a focusing/tracking servo-control of the optical pickup on the basis of a control signal from the controller 12. The controller 12 has a polarization-direction-change discriminator 13 and controls the liquid crystal driver 14 and the optical pickup driver 8 on the basis of a discrimination result by the polarization-direction-change discriminator 13.

Figure 3:
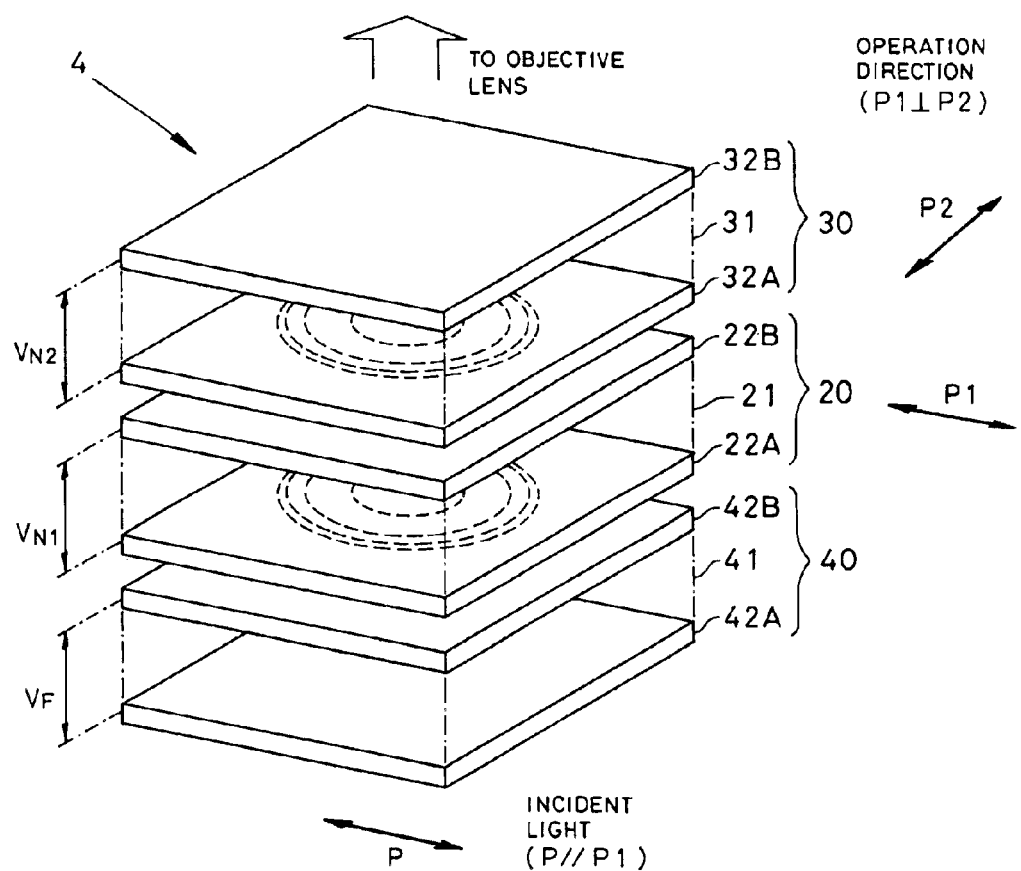
FIG. 3 is an exploded view schematically showing a configuration of an aberration correcting unit according to the first embodiment of the present invention.

A configuration of the aberration correcting unit 4 will now be described hereinbelow with reference to the drawings. FIG. 3 is an exploded view schematically showing the configuration of the aberration correcting unit 4. As shown in the diagram, the aberration correcting unit 4 is constructed by liquid crystal elements 20, 30 and a polarization-direction changing element 40. The irradiation laser beam which is emitted from the light source 1 and is transmitted in the beam splitter 3 passes through the polarization-direction changing element 40 and liquid crystal elements 20, 30 and is guided to the objective lens 5.

Figure 4:
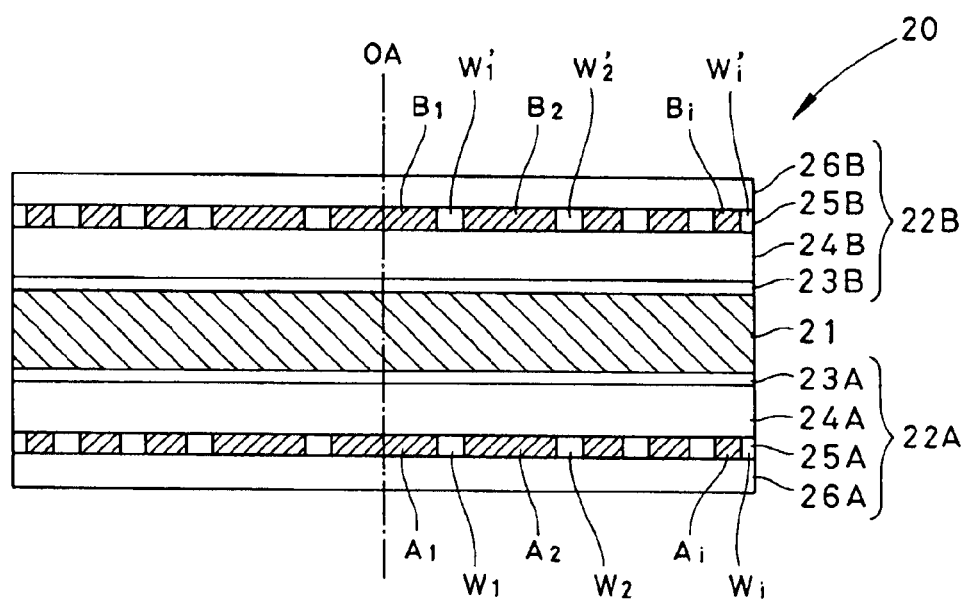
FIG. 4 is a cross sectional view schematically showing a configuration of a liquid crystal element 20 shown in FIG. 3.

The liquid crystal element 20 includes a liquid crystal which causes an electro-optical effect by an applied electric field as shown in a cross sectional view of FIG. 4. More specifically, the liquid crystal element 20 includes a liquid crystal 21 such as a nematic liquid crystal or the like which provides a birefringence change in accordance with a magnitude of an applied voltage by the liquid crystal driver 14. As shown in FIGS. 3 and 4, the liquid crystal element 20 has a configuration such that the liquid crystal 21 is sandwiched and sealed between two electrode portions 22A and 22B which are opposed to each other. In more detail, liquid crystal orientation films 23A and 23B, insulating layers 24A and 24B, electrodes 25A and 25B, and insulating substrates 26A and 26B such as transparent glass substrates or the like are sequentially formed on both sides of the liquid crystal 21, respectively. As shown in FIG. 3, the liquid crystal element 20 is formed so as to have an orientation direction (P1) in approximately the same direction as the polarization direction of the incident laser beam (P) into the aberration correcting unit 4 (i.e., P1//P). It should be noted that the "orientation direction" of the liquid crystal element is defined to include the direction of the liquid crystal orientation projected on a plane perpendicular to the optical axis.

At least one of the electrodes 25A and 25B is constructed to have a plurality of divisional or partitioned electrodes for correcting the aberration caused in the optical path. A voltage according to a magnitude and a distribution shape of the aberration is applied to each divisional electrode. As mentioned above, the magnitude of aberration and/or a distribution shape in the plane perpendicular to the optical axis greatly changes when changing the recording layer from/to which the reading or recording operation is performed (hereinafter, referred to as an inter-layer jump), since the thickness of the transparent layer between the disc surface and the recording layer differs in dependence on the recording layer.

Figure 5:
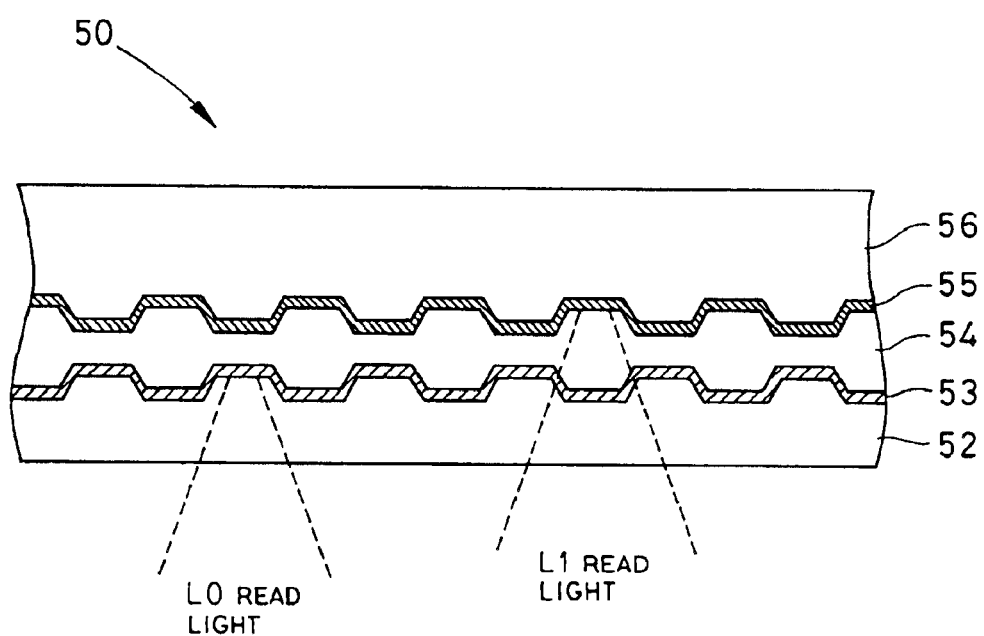
FIG. 5 is a cross sectional view schematically showing a structure of a 2-layer disc.

FIG. 5 is a cross sectional view schematically showing a structure of a 2-layer disc 50. The 2-layer disc 50 has a structure such that two injection-molded substrates are joined so as to face each other. The first layer when it is seen from the reading side is called layer 0 (L0) and the second layer is called layer 1 (L1). In more detail, an L0 substrate 52, an L0 reflecting film 53, a spacer layer 54, an L1 reflecting film 55, and an L1 substrate 56 are sequentially formed in order from the reading side.

The L0 reflecting film 53 is formed as a semitransparent film so that the laser beam is transmitted through the layer 0 (L0) and a signal of the layer 1 (L1) can be read. The L0 reflecting film 53 is made of gold (Au), a dielectric substance, or the like. On the other hand, the L1 reflecting film 55 has high reflectance and is made of, for example, aluminum (Al) or the like in a manner similar to a single-layer disc. The spacer layer 54 is provided between the layer L0 and layer L1 in order to separate the signal surfaces with a predetermined thickness or distance. The spacer layer 54 is made of a material having a high transmittance in a wavelength band of read/write light and a refractive index near a refractive index of the substrate, for example, an ultraviolet hardening resin material, since the read/write light passes through the spacer layer 54. Both signals from L0 and L1, therefore, can be read out by moving a focal point (inter-layer jump) of the laser beam in the depth direction.

Figure 6:
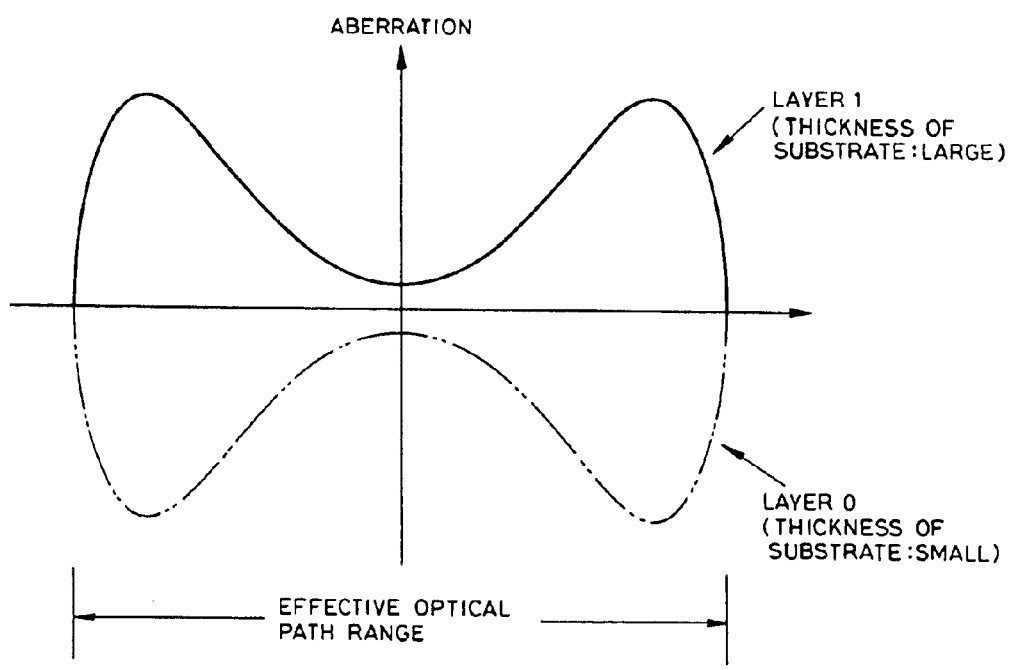
FIG. 6 is a diagram showing distribution curves of the spherical aberration in a plane perpendicular to an optical axis with respect to L0 and L1 layers of the 2-layer disc.

FIG. 6 shows distribution curves of the spherical aberration in a plane perpendicular to an optical axis with respect to the substrate thickness (i.e., depth of recording layer). The spherical aberration is a principal aberration among the aberrations caused by the optical disc when recording or reproduction to/from the 2-layer disc 50 is performed. The aberration is small in the center portion of the optical path and increases as the radial position approaches the outside except the outermost rim portion, when the laser beam is irradiated on the L1 reflecting film 55 (i.e., when the substrate is thick). On the other hand, the aberration decreases as the radial position approaches the outside from the center portion of the optical path, when the laser beam is irradiated on the L0 reflecting film 53 (i.e., when the substrate is thin).

The electrode 25A of the liquid crystal element 20 is divided so as to correct the spherical aberration which is caused when the laser beam is irradiated to the layer L0 and a predetermined voltage can be applied to each divisional electrode.

Figure 7:
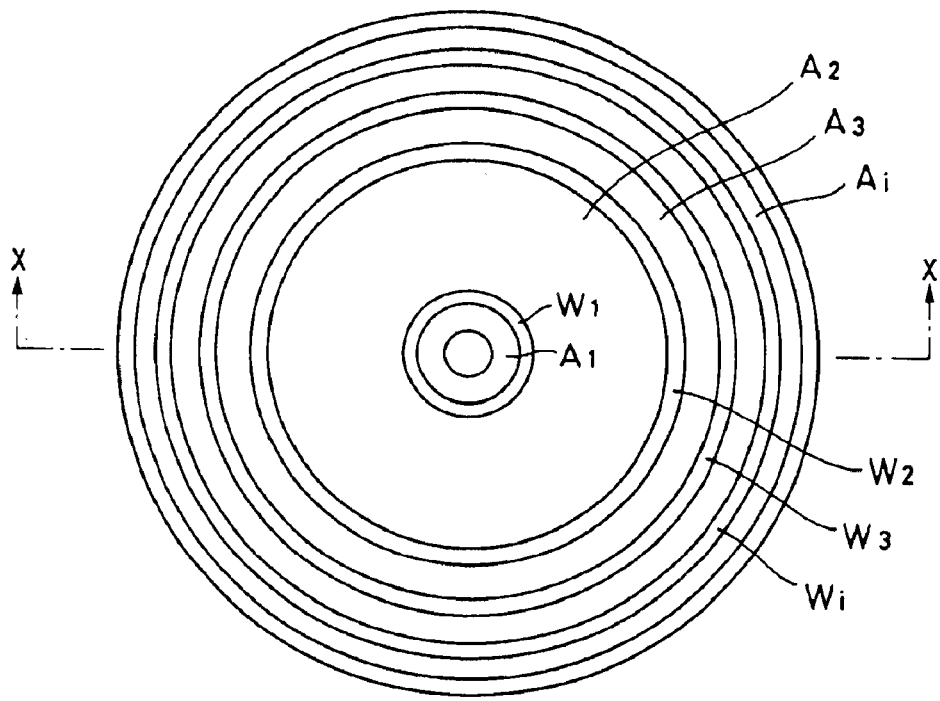
FIG. 7 is a plan view schematically showing an example of an electrode structure for correcting a spherical aberration which is caused when a laser beam is irradiated on a layer L0.

FIG. 7 is a plan view schematically showing an example of the electrode 25A for correcting the spherical aberration which is caused when the laser beam is irradiated to the layer L0 of the optical disc 9. The electrode 25A has a plurality of transparent electrodes A1 to Ai corresponding to aberration correction regions (AR1 to ARi). The electrode 25A has a structure having the transparent electrodes A1 to Ai formed so as to be electrically isolated from each other and a plurality of gaps Wj (j=1 to i) each existing between the transparent electrodes (i.e., between $A_j$ and $A_{j+}$) as shown in FIGS. 4 and 7. In more detail, the transparent electrode A1 is formed in a shape (circular shape in FIG. 7) according to the aberration correction region AR1. The transparent electrodes A2 to Ai are formed in shapes (ring shapes in FIG. 7)

according to the aberration correction regions AR2 to ARi. The gaps W1 to Wi which separate the transparent electrodes A1 to Ai are formed in ring shapes. Each of the transparent electrodes A1 to Ai may be made of, for example, an ITO (indium tin oxide) layer.

The electrode 25B also similarly has a structure having transparent electrodes B1 to Bi formed so as to be electrically isolated from each other and a plurality of gaps W'j (j=1 to i) each existing between the transparent electrodes (i.e., between $B_j$ and $B_{j+1}$).

By applying a driving voltage $V_{N1}$ (=$V_{N1}$(j), j–1 to i) to the electrodes 25A and 25B, an orientation state of liquid crystal molecules in the liquid crystal 21 changes in accordance with the electric field $E_{N1}$ which is generated by the applied driving voltage $V_{N1}$. The light passing through the liquid crystal 21 is, thus, subjected to birefringence and phase of the light is changed. The phase of the laser beam which passes through the liquid crystal 21 can be controlled by the driving voltage $V_{N1}$ which is applied to the liquid crystal 21. The liquid crystal element 20 has bidirectional light permeability and birefringence characteristics so that any one of the insulating substrates 26A and 26B can be arranged so as to face the objective lens 5.

When one of the electrodes, for example, the electrode 25A is formed so as to have a plurality of divisional electrodes, the electrode 25B does not need to be divided. For example, it may be formed as an "overall" electrode wherein the electrode extends over the entire surface, or is formed in a required shape or divided into a required number of divisional electrodes according to the characteristic and/or the distribution shape of aberration to be compensated.

The liquid crystal element 30 has a configuration similar to that of the liquid crystal element 20. More particularly, the element 30 has a configuration such that liquid crystal 31 such as a nematic liquid crystal or the like is sandwiched and sealed between two electrode portions 32A and 32B which are opposed to each other. At least one of the electrode 32A and 32B has a plurality of divisional electrodes for correcting the aberration caused in the optical path. The electrodes 32A and 32B of the liquid crystal element 30 are formed having a plurality of divisional electrodes suitable for correcting the spherical aberration caused when the laser beam is irradiated to the layer L1. A predetermined voltage can be applied to each divisional electrode. When a driving voltage $V_{N2}$ (=$V_{N2}$(j), j =1 to k) is applied to the electrode 32A and 32B, therefore, an orientation state of the liquid crystal molecules in the liquid crystal 31 changes in accordance with an electric field $E_{N2}$ which is caused by the driving voltage $V_{N2}$. The laser beam which passes through the liquid crystal 31 is, thus, subjected to birefringence of the liquid crystal 31 and phase of the light is changed. The phase of the laser beam which passes through the liquid crystal 21 can be controlled by the driving voltages $V_{N2}$ which are applied to the liquid crystal 31.

The liquid crystal element 30 is arranged so as to have an orientation direction (P2) perpendicular to the polarization direction of incident laser beam (P) into the aberration correcting unit 4, hence, perpendicular to the orientation direction of the liquid crystal element 20 (P1) as shown in FIG. 3 (i.e., P2⊥P1). Therefore, for example, it is possible to employ a liquid crystal element similar to the liquid crystal element 20 wherein the liquid crystal element is rotated by approximately 90° around the optical axis (OA) of the optical path with respect to the liquid crystal element 20.

Figure 8:
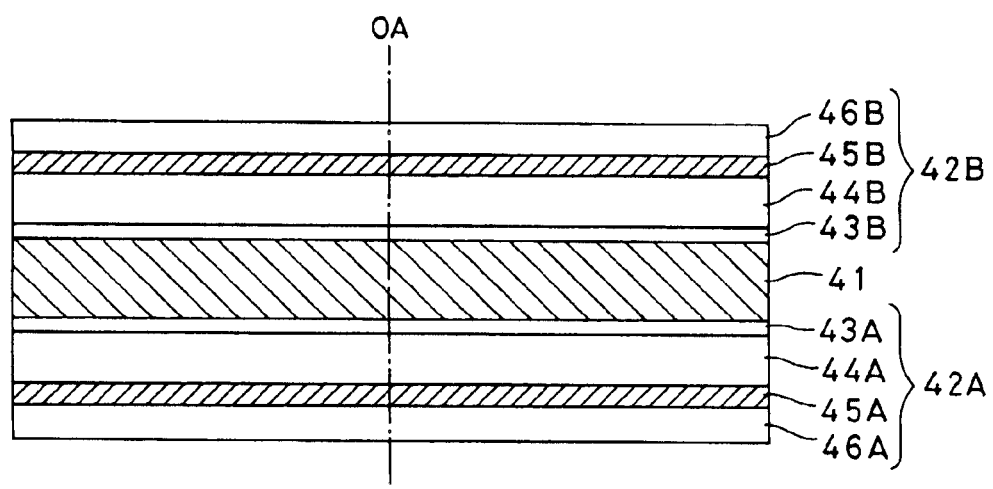
FIG. 8 is a cross sectional view schematically showing a configuration of a polarization-direction changing element.

As shown in a cross sectional view of FIG. 8, the polarization-direction changing element 40 has a liquid crystal 41 being held between two electrode portions 42A and 42B which are opposed to each other. The liquid crystal 41 changes the polarization direction of the incident laser beam when an electric field is applied. The liquid crystal 41 is ferrodielectric liquid crystal of which response speed is higher than that of the nematic liquid crystal or the like which isused in the liquid crystal elements 20 and 30. Liquid crystal orientation films 43A and 43B, insulating layers 44A and 44B, electrodes 45A and 45B, and insulating substrates 46A and 46B such as transparent glass substrates or the like are sequentially formed on the ferrodielectric liquid crystal 41, respectively. The electrodes 45A and 45B are overall electrodes formed in regions extending over the whole surface of the liquid crystal 41.

The polarization-direction changing element 40 is constructed so as to rotate the polarization direction of the incident laser beam by approximately 90° by applying a predetermined voltage ($V_F$) across the electrodes 45A and 45B. More specifically, the polarization direction of the laser beam which entered the polarization-direction changing element 40 is not changed when no voltage is applied to the electrodes 45A and 45B. The laser beam passes through as it is in the polarization-direction changing element 40. On the other hand, the polarization direction of the incident laser beam passing through the polarization-direction changing element 40 is rotated by approximately 90° when the predetermined voltage $V_F$ is applied to the electrodes 45A and 45B.

Figure 9:
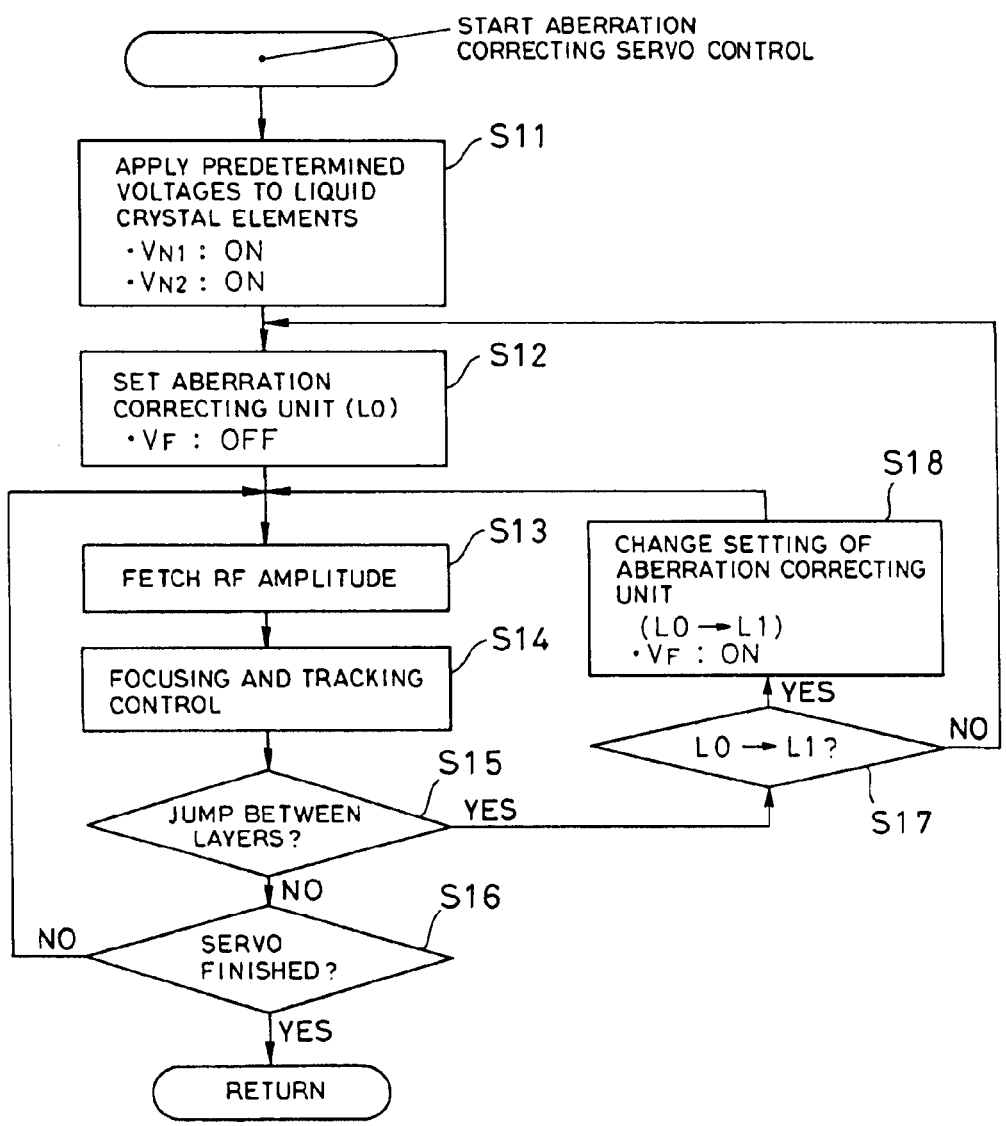
FIG. 9 is a flowchart showing a procedure of an aberration correction servo-control when recording or reproducing the 2-layer disc.

The aberration correction in the embodiment will now be described in detail with reference to a flowchart shown in FIG. 9.

The flowchart shows a procedure for an aberration correction servo-control in a recording or reproducing operation of a 2-layer disc. The procedure is executed under control of the controller 12, for example, after the end of set-up upon recording or reproducing the optical disc 9. For convenience of explanation, a case of starting the servo-control from the layer 0 (L0) will be described as an example.

The controller 12 applies the predetermined voltages $V_{N1}$ (=$V_{N1}$ (j), j=1 to i) and $V_{N2}$ (=$V_{N2}$ (j), j=1 to k) to the liquid crystal elements 20 and 30, respectively (step S11).

Subsequently, the aberration correcting unit 4 is set so as to be adapted to the servo-control for the layer L0 (step S12). More specifically, the voltage which is applied to the polarization-direction changing element 40 is turned off ($V_F$ =0). The laser beam (laser beam emitted from the laser light source) which enters the polarization-direction changing element 40 passes through as it is in the polarization-direction changing element 40 without being subjected to the rotation of the polarization direction.

By the foregoing set-up, the reflected laser beam from the optical disc having approximately the same polarization direction as that of the laser beam passes through without being subjected to a phase change by the liquid crystal element 30 arranged in the direction approximately perpendicular to the polarization direction. The reflected laser beam passed through the liquid crystal element 30 is subjected to a phase change by the liquid crystal element 20 arranged in the direction that is approximately the same as the polarization direction, so that the aberration of the laser beam is corrected. Therefore, the aberration caused by the reflection at the layer L0 is corrected by the liquid crystal element 20 which is configured or set so as to be adapted to the aberration correction for the layer L0.

Subsequently, an RF amplitude value is fetched from the RF amplitude detector 11 (step S13) and a focusing control and a tracking control are executed on the basis of a magnitude of the fetched RF amplitude values (step S14).

The polarization-direction-change discriminator 13 provided in the controller 12 determines whether an inter-layer jump is executed or not on the basis of data from an RF signal processing unit (not shown) for processing the RF data signal read out from the optical disc (step S15). If it is determined by the polarization-direction-change discriminator 13 that the inter-layer jump is not executed, the controller 12 further determines whether the servo-control is finished or not (step S16). If the servo-control is not terminated, control is returned to step S13 and the focusing control and tracking control are repeated. This processing routine is skipped when finishing the servo-control. It is sufficient that the polarization-direction-change discriminator 13 is a means which has a capability of determining a timing for the inter-layer jump. For example, it is possible to determine the timing of the inter-layer jump on the basis of data which has previously been read and stored as TOC (Table of Contents) information or data indicating the inter-layer jump appearing in the read data signal.

If it is determined in step S15 that the inter-layer jump is executed, then, it is determined whether the inter-layer jump is from the layer L0 to the layer L1 or not (step S17). If it is determined that the inter-layer jump is from the layer L0 to the layer, the aberration correcting unit 4 is set so as to be adapted to the servo-control for the layer L1 (step S18). More particularly, the polarization direction of the laser beam which enters the polarization-direction changing element 40 is rotated by approximately 90° by applying a predetermined voltage to the polarization-direction changing element 40 ($V_F$: ON). The reflected laser beam from the optical disc having the polarization direction approximately perpendicular to the direction of the laser beam is, therefore, subjected to the phase change by the liquid crystal element 30 and the aberration is corrected. The aberration corrected laser beam passes through without being subjected to the phase change by the liquid crystal element 20. The aberration caused due to the reflection of the light from the layer L1 is corrected by the liquid crystal element 30 which is configured or set so as to be adapted to the correction of the aberration.

If it is determined in step S17 that the jump is not the inter-layer jump from the layer L0 to the layer L1 (i.e., it is the inter-layer jump from the layer L1 to the layer L0), control is returned to step S12. The subsequent processing steps are repeated.

According to the above-described procedure, high-speed aberration correction can be performed by switching the polarization direction of the irradiated laser beam in accordance with the inter-layer jump.

Second Embodiment

Figure 10:
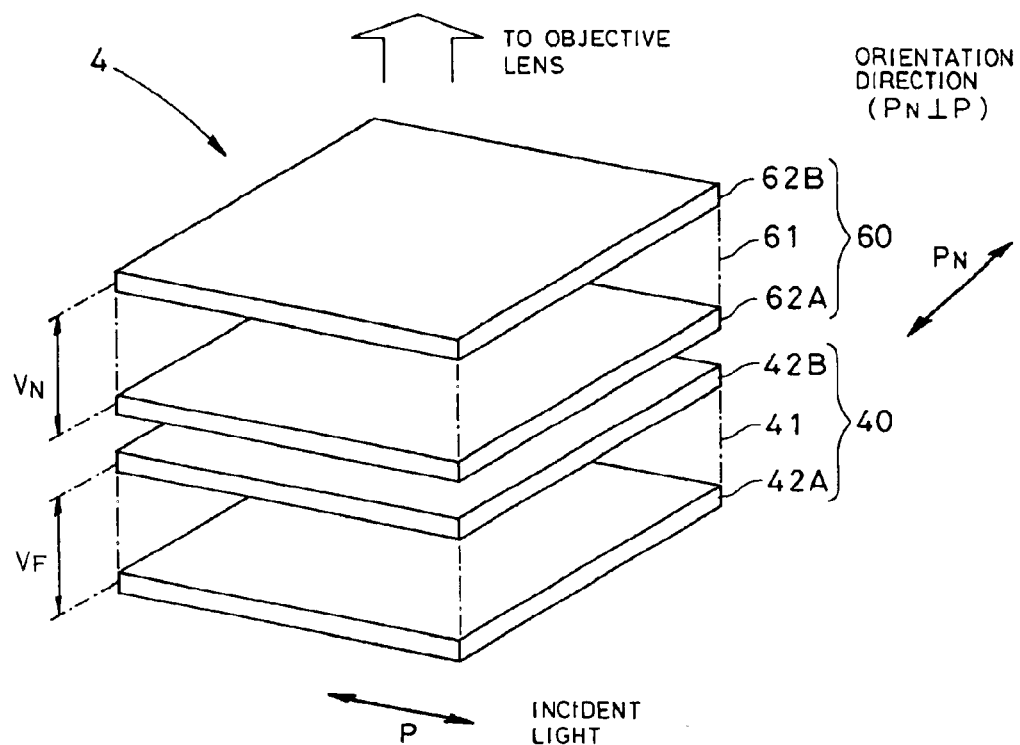
FIG. 10 is an exploded view schematically showing a configuration of an aberration correcting unit according to the second embodiment of the present invention.

FIG. 10 is an exploded view schematically showing a configuration of an aberration correcting unit according to the second embodiment of the present invention. As shown in the diagram, the aberration correcting unit 4 includes the polarization-direction changing element 40 and one liquid crystal element 60.

The liquid crystal element 60 has a configuration similar to that of the liquid crystal element 20. More specifically, a liquid crystal 61 such as a nematic liquid crystal or the like is held between two electrode portions 62A and 62B which are opposed to each other. At least one of the electrode 62A and 62B has a plurality of divisional electrodes adapted to correct the aberration caused in the optical path. It is sufficient that the divisional electrodes are formed in shapes according to a characteristic of a desired aberration to be corrected or are divided into the necessary number of electrodes with desired shapes. The liquid crystal 61 of the liquid crystal element 60 has an orientation direction ($P_N$) approximately perpendicular to the polarization direction (P) of the incident laser beam.

A high-speed aberration correction can be performed by switching the predetermined voltage ($V_F$) to the polarization-direction changing element 40 between OFF and ON state while applying voltages to the divisional electrodes of the liquid crystal element 60 for correcting the desired aberration.

In the embodiments described above, although the layers in a range from the reading side surface to the recording layer are called "transparent substrate" or merely "substrates" for the DVD optical disc as an example, generally, the layers are not limited to substrates. In other words, "substrate" of the description denotes layers such as a cover layer, a transparent layer, and the like formed on the recording layer on the reading side of the optical disc, namely, the layers through which the laser beam passes upon irradiation.

As will be obviously understood from the above description, according to the present invention, the aberration correcting unit, the optical pickup apparatus, and the recording/reproducing apparatus of high performance which has a capability of performing high-speed aberration correction can be realized.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on a Japanese Patent Application No. 2000-152270 which is hereby incorporated by reference.

What is claimed is:

1. An aberration correcting unit for correcting an aberration caused in an optical path of an optical system which irradiates a light beam onto a recording medium and guides reflection light reflected by said recording medium, comprising:

a liquid crystal element having electrode layers which are opposed to each other and a liquid crystal sandwiched between said electrode layers, said liquid crystal element having a predetermined orientation direction and providing a light passing therethrough with a phase change by applying a voltage across said electrode layers; and a polarization-direction changing element arranged in an optical path between a light source of said light beam and said liquid crystal element and having a polarization-direction changing substance to change a polarization direction of said light beam in accordance with a change in voltage applied to said polarization-direction changing substance.

2. A unit according to claim 1, wherein said polarization-direction changing element changes the polarization direction of said light beam so as to be substantially identical to said predetermined orientation direction.

3. A unit according to claim 1, wherein said polarization-direction changing substance comprises a ferrodielectric substance.

4. A unit according to claim 2, wherein said polarization-direction changing substance comprises a ferrodielectric substance.

5. A unit according to any one of claims 1 through 4, wherein at least one of said electrode layers which are opposed to each other is divided so as to correct the aberration of the light beam having a polarization direction substantially identical to said predetermined orientation direction.

6. An aberration correcting unit for correcting an aberration caused in an optical path of an optical system which irradiates a light beam onto a recording medium and guides reflection light reflected by said recording medium, comprising:
a liquid crystal element having electrode layers which are opposed to each other and a liquid crystal sandwiched between said electrode layers, said liquid crystal element having a predetermined orientation direction and providing a light passing therethrough with a phase change by applying a voltage across said electrode layers;
a polarization-direction changing element arranged in an optical path between a light source of said light beam and said liquid crystal element to change a polarization direction of said light beam; and
a controller for controlling said polarization-direction changing element to change the polarization direction of said light beam at a predetermined timing.

7. A unit according to claim 6, wherein said recording medium has a plurality of recording layers and said predetermined timing is a timing of changing the recording layers on which said light beam is irradiated.

8. A unit according to claim 6, wherein said polarization-direction changing element changes the polarization direction of said light beam so as to be substantially identical to said predetermined orientation direction.

9. A unit according to claim 7, wherein said polarization-direction changing element changes the polarization direction of said light beam so as to be substantially identical to said predetermined orientation direction.

10. A unit according to any one of claims 6 through 9, wherein said polarization-direction changing element includes a ferrodielectric substance and the polarization direction of said light beam is changed in accordance with a change in voltage applied to said ferrodielectric substance.

11. A unit according to any one of claims 6 through 9, wherein at least one of said electrode layers which are opposed to each other is divided so as to correct the aberration of the light beam having a polarization direction that is substantially identical to said predetermined orientation direction.

12. A unit according to any one of claim 10, wherein at least one of said electrode layers which are opposed to each other is divided so as to correct the aberration of the light beam having a polarization direction substantially identical to said predetermined orientation direction.

13. An optical pickup apparatus having the aberration correcting unit according to any one of claims 1 through 4, comprising:
a light source for emitting said light beam; and
a photodetector for detecting the light beam which has been reflected by said recording medium and passed through said aberration correcting unit.

14. An optical pickup apparatus having the aberration correcting unit according to any one of claims 6 through 9, comprising:
a light source for emitting said light beam; and
a photodetector for detecting the light beam which has been reflected by said recording medium and passed through said aberration correcting unit.

15. An optical pickup apparatus having the aberration correcting unit according to claim 11, comprising: voltage applying means for applying a different voltage to each of the divisional electrodes.

16. A recording/reproducing apparatus which has the optical pickup apparatus according to claim 13 and reads recorded information from a recording medium having a plurality of recording layers to perform reproduction, comprising:
inter-layer jumping means for performing an inter-layer jump to change an irradiation of the light beam from one recording layer to another recording layer; and
a controller for controlling said polarization-direction changing element to change the polarization direction of said light beam at the time of performing said inter-layer jump.

17. A recording/reproducing apparatus which has the optical pickup apparatus according to claim 14 and reads recorded information from a recording medium having a plurality of recording layers to perform reproduction, comprising:
inter-layer jumping means for performing an inter-layer jump to change an irradiation of the light beam from one recording layer to another recording layer; and
a controller for controlling said polarization-direction changing element to change the polarization direction of said light beam at the time of performing said inter-layer jump.

18. An aberration correcting unit for correcting an aberration caused in an optical path of an optical system which irradiates a light beam onto a recording medium and guides reflection light reflected by said recording medium, comprising:
a first liquid crystal element having first electrode layers which are opposed to each other and a liquid crystal sandwiched between said first electrode layers, said first liquid crystal element having a first predetermined orientation direction and providing a light passing therethrough with a phase change by applying a voltage across said first electrode layers;
a second liquid crystal element having second electrode layers which are opposed to each other and a liquid crystal sandwiched between said second electrode layers, said second liquid crystal element having a second predetermined orientation direction that is substantially perpendicularly to said first orientation direction and providing a light passing therethrough with a phase change by applying a voltage across said second electrode layers; and
a polarization-direction changing element arranged in the optical path between a light source of said light beam and said first and second liquid crystal elements to change a polarization direction of said light beam.

19. A unit according to claim 18, wherein said first liquid crystal element provides a light passing therethrough with a phase change for correcting a first aberration caused due to the reflection of the light from said recording medium, and said second liquid crystal element provides a light passing therethrough with a phase change for correcting a second aberration different from said first aberration.

20. A unit according to claim 18, wherein said polarization-direction changing element changes the polarization direction of said light beam so as to be substantially identical to one of said first and second orientation directions.

21. A unit according to claim 19, wherein said polarization-direction changing element changes the polarization direction of said light beam so as to be substantially identical to one of said first and second orientation directions.

22. A unit according to any one of claims 18 through 21, wherein said polarization-direction changing element includes a ferrodielectric substance, and the polarization direction of said light beam is changed in accordance with a change in voltage applied to said ferrodielectric substance.

23. A unit according to claim 19, wherein at least one layer of said first electrode layers which are opposed to each other is divided so as to correct said first aberration, and at least one layer of said second electrode layers which are opposed to each other is divided so as to correct said second aberration.

24. A unit according to any one of claims 18 through 21, wherein said recording medium has a plurality of recording layers, and said first and second liquid crystal elements produce phase changes in the light passing therethrough for correcting a first aberration caused by one of said plurality of recording layers and a second aberration caused by another recording layer.

25. An optical pickup apparatus having the aberration correcting unit according to any one of claims 18 through 21, comprising:
   a light source for emitting said light beam; and
   a photodetector for detecting the light beam reflected by said recording medium and passes through in said aberration correcting unit.

26. An optical pickup apparatus having the aberration correcting unit according to claim 22, comprising:
   a light source for emitting said light beam; and
   a photodetector for detecting the light beam reflected by said recording medium and passes through in said aberration correcting unit.

27. An optical pickup apparatus having the aberration correcting unit according to claim 23, having
   voltage applying means for applying a different voltage to each of the divisional electrodes of said first electrode layers which are opposed to each other and each of the divisional electrodes of said second electrode layers which are opposed to each other.

28. A recording/reproducing apparatus which has the optical pickup apparatus according to claim 25 and records and/or reproduces information to/from a recording medium having a plurality of recording layers, comprising:
   instructing means for generating an inter-layer jump command for changing a recording layer to which the light beam is irradiated from one recording layer to another recording layer on the basis of a read signal from said recording medium;
   inter-layer jumping means for performing said inter-layer jump in response to said inter-layer jump command; and
   a controller for controlling said polarization-direction changing element to change the polarization direction of said light beam at the time of performing said inter-layer jump.

29. A recording/reproducing apparatus which has the optical pickup apparatus according to claim 26 and records and/or reproduces information to/from a recording medium having a plurality of recording layers, comprising:
   instructing means for generating an inter-layer jump command for changing a recording layer to which the light beam is irradiated from one recording layer to another recording layer on the basis of a read signal from said recording medium;
   inter-layer jumping means for performing said inter-layer jump in response to said inter-layer jump command; and
   a controller for controlling said polarization-direction changing element to change the polarization direction of said light beam at the time of performing said inter-layer jump.

30. An apparatus according to claim 28, wherein said controller controls said polarization-direction changing element to change the polarization direction of said light beam to the direction that is substantially perpendicularly to the polarization direction before said inter-layer jump is performed.

31. An apparatus according to claim 30, wherein said controller, in response to said inter-layer jump command, stops a supply of the voltage applied to the liquid crystal element having an orientation direction that is substantially identical to the polarization direction of said light beam before said inter-layer jump is performed and applies a voltage to the other liquid crystal element.

* * * * *